J. L. MAULL.
FRUIT SORTING MACHINE.
APPLICATION FILED OCT. 29, 1913.
1,114,499.
Patented Oct. 20, 1914.
2 SHEETS—SHEET 1.
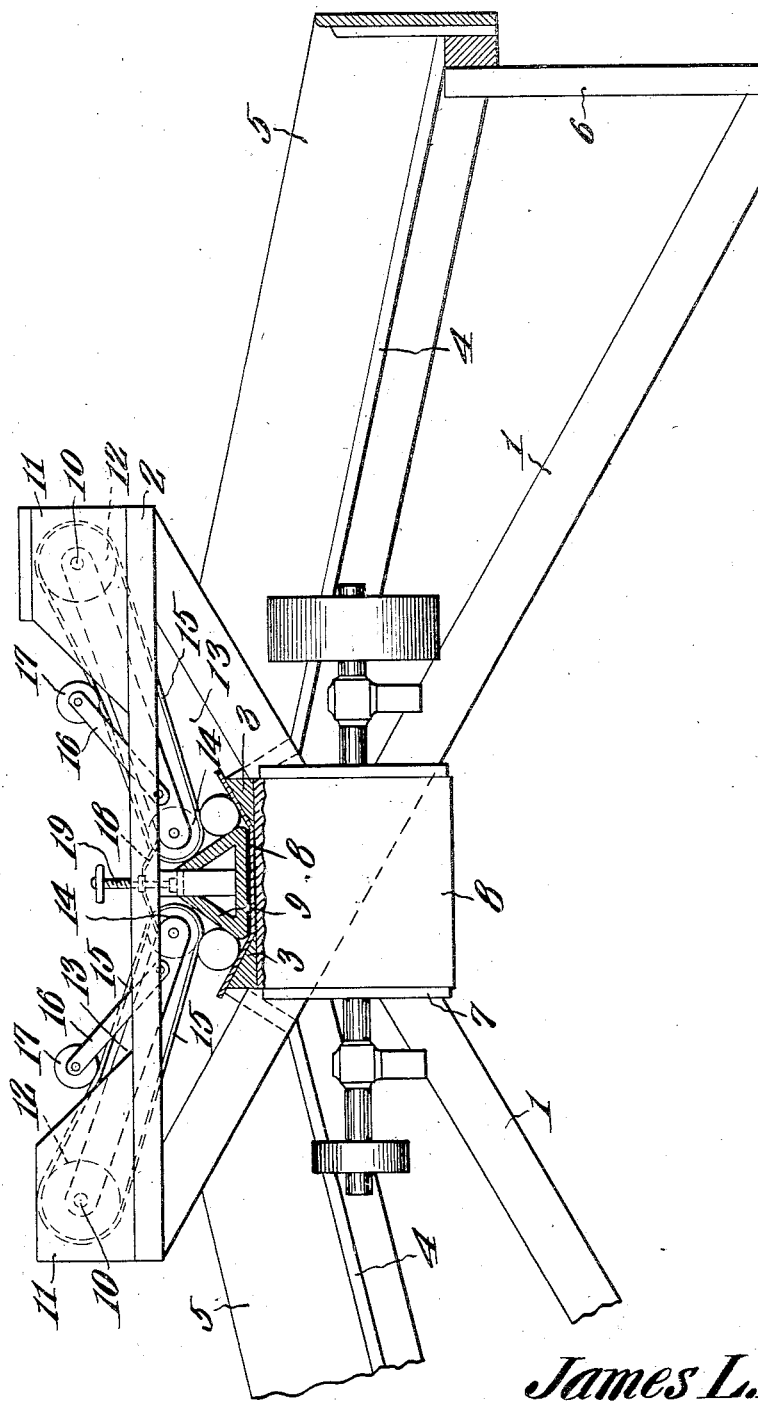
James L. Maull,
Inventor
by C. A. Snow & Co.
Attorneys
Witnesses J. L. MAULL.
FRUIT SORTING MACHINE.
APPLICATION FILED OCT. 29, 1913.
1,114,499.
Patented Oct. 20, 1914.
2 SHEETS—SHEET 2.
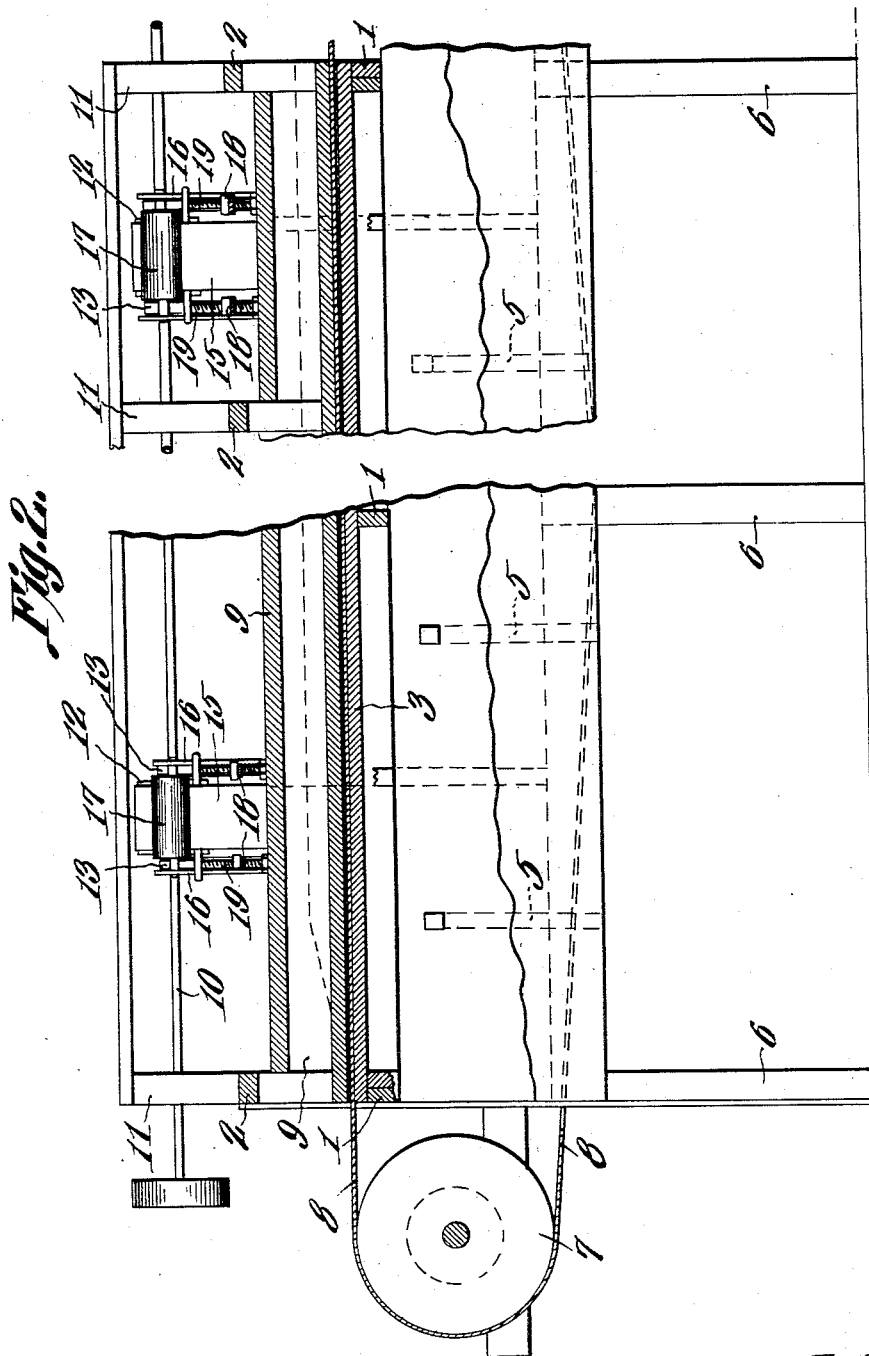
Witnesses
James L. Maull,
Inventor
by C.A. Snow & Co.
Attorneys

UNITED STATES PATENT OFFICE.

JAMES L. MAULL, OF CRESCENT CITY, FLORIDA.

FRUIT-SORTING MACHINE.

1,114,499. Specification of Letters Patent. Patented Oct. 20, 1914.

Application filed October 29, 1913. Serial No. 798,121.

*To all whom it may concern:*

Be it known that I, JAMES L. MAULL, a citizen of the United States, residing at Crescent City, in the county of Putnam and State of Florida, have invented a new and useful Fruit-Sorting Machine, of which the following is a specification.

The present invention appertains to fruit sorting machines and aims primarily to provide a novel and improved apparatus for assorting fruits or other commodities in a rapid and efficient manner.

Another object of the present invention is to provide a machine of the nature indicated, which shall be so constructed and operable, as to assort the fruit in grades of different sizes and according to the major or largest diameters of the fruit.

A further object of the present invention is to provide a fruit assorting machine embodying a novel or unique assemblage of parts to carry out the results desired in a highly efficacious manner and in order that accurate adjustments may be made to properly assort the fruit in various grades or sizes.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:

Figure 1 is an end view of the machine, parts being broken away and parts being shown in section. Fig. 2 is a side elevation of the machine, parts being broken away and parts being shown in section.

In carrying out the present invention, there is provided a suitable supporting frame or structure, which as illustrated, preferably embodies a plurality of pairs of crossed timbers 1 carrying cross beams 2 at their upper ends.

The several crossed timbers or supporting sections of the frame, stand transversely of the machine as a whole, and a trough or bed 3 is secured within the upper crotches formed by the upper end portions or arms of the timbers 1, so that the trough 3 extends longitudinally underneath the beams 2, the trough being carried by the timbers 1 in any convenient manner. The bottom of the trough 3 is flat, while the sides of the trough are inclined laterally at an angle of approximately 30°, as clearly seen in Fig. 1.

Along each side of the frame or supporting structure, is disposed an inclined table 4, the inner or upper edges of the tables being attached to the upper end portions, or arms of the timbers 1 in any convenient manner, in order that the tables 4 will slope from the sides of the trough 3. Upon the tables 4 are secured suitable partitions 5, which extend away from the sides of the trough 3, and which provide bins or receptacles for the fruit, the tables 4 forming the bottoms or chutes for the several bins. The outer ends of the bins are supported by suitable legs 6.

A suitable driving pulley 7 is carried by the forward end of the frame, to be driven in any suitable manner, and is preferably so disposed, that the plane of the bottom of the trough 3 will be tangent to the top of the said pulley. A belt 8 is trained over the pulley 7, and has its upper run disposed within the trough 3, the belt 8 being trained over an idler (not shown) disposed at the rear end of the frame. The lower run of the belt 8 passes beneath the crossing points of the timbers 1.

Supported from the beams 2 is a longitudinal rail 9 of a triangular cross section, and the base or bottom of which is disposed over the median portion of the belt 8 and directly above the bottom of the trough 3, so that the median portion of the belt passes snugly between the rail 9 and the bottom of the trough. The bottom or base of the rail 9 is of a width practically the same as the width of the bottom of the trough 3, and the sides of the rail 9 are preferably inclined at an angle of approximately 60° in order that they will be approximately at right angles to the sides of the trough 3. The side portions of the belt 8 will then be deflected upwardly upon the inclined sides of the trough 3, as clearly illustrated in Fig. 1, and the belt is of sufficient width in order that its side edges will project slightly beyond the sides of the trough. Thus, it may be said that the sides of the rail 9 form auxiliary or supplemental troughs V-shaped with the side portions of the belt, or the sides of the trough 3. It is along these supplemental or auxiliary troughs that the fruit is adapted to be conveyed or fed by the belt 8, as will hereinafter more fully appear, the rail, trough and belt constituting the feeder.

Coöperating with the supplemental or auxiliary troughs, are a suitable number of gaging and ejecting devices, a series of gaging and ejecting devices being disposed at each side of the rail 9. To this end a pair of longitudinal shafts 10 are journaled through bearings 11 carried by the respective ends of the beams 2. Each of the gaging and ejecting devices embodies a pulley 12 feathered or keyed upon the respective shaft 10, an oscillatory frame including the arms 13 connected loosely to the respective shaft 10 at the sides of the pulley 12, a pulley 14 journaled between the free ends of the respective arms 13, and a gaging and ejecting belt 15 trained over the pulleys 12 and 14 to be driven by the shaft 10. It is to be understood that the shafts 10 may be driven from the shaft of the driving pulley 7, or in any other suitable manner, as will be apparent to the artisan.

The pulley 14 of each gaging and ejecting device is disposed directly adjoining the corresponding side of the rail 9, and over the corresponding side portion of the conveyer or feed belt 8, in order that the lower run of the gaging and ejecting belt 15 will travel above the side portion of the belt 8. The shafts 10 are driven in the proper directions in order that the lower run of the gaging and ejecting belts 15 will travel upwardly or outwardly and the parts are preferably so proportioned that the lower runs of the gaging belts 15 will be at a slight angle with the respective side portions of the conveyer belt 8.

Each of the gaging belts is maintained in taut condition, by means of a pair of links 16 pivoted to the respective arms 13 and carrying an idler 17 at their free ends, which is adapted to bear upon the upper run of the gaging belt 15, the weight of the idler 17 depressing the upper run of the belt 15 sufficiently to maintain the said belt taut, and to permit the lower run of the said belt to yield when necessary.

It is evident from the foregoing that the inner or free ends of the gaging device frames may be swung to and from the side portions of the conveyer belt 8, and to adjustably support the said ends of the said frames, suitable yokes or carriers 18 connect the free ends of the opposite arms 13, above the rail 9, and supporting screws 19 are carried by the yokes or brackets 18 and seat upon the rail 9. It will thus be evident that by adjusting the several screws 19, the gaging device may be properly positioned with respect to the side portions of the conveyer or belt.

Each set or pair of the gaging devices may be adjusted longitudinally of the machine as a whole, inasmuch as the pulleys 12 are feathered upon the shafts 10, and inasmuch as the screws 19 merely rest upon the ridge of the rail 9, the arms 13 also being loose upon the shafts 10.

In practice, the machine may be built to any suitable length, in order that any number of gaging and ejecting devices may be employed, so as to properly assort the particular fruit into the requisite sizes. The machine may be adapted for various fruits or commodities, by adjusting the gaging devices both longitudinally of the machine, and vertically relative to the side portions of the conveyer or feed belt, as above intimated. Thus, the pulleys 14 of the successive gaging devices are adjusted relatively closer to the side portions of the conveyer belt from the forward to the rear end of the machine. In use, the fruit to be assorted or sized is run onto the forward portion of the conveyer belt at the sides of the forward end of the rail 9, the upper run of the conveyer belt 8 being made to travel longitudinally rearward. Thus, as the upper run of the conveyer belt moves rearwardly, the fruit will be conveyed or fed along the supplemental troughs defined between the sides of the rail 9 and the inclined side portions of the conveyer belt. Inasmuch as the side portions of the conveyer belt are inclined, the fruit will rest or lean against the sides of the rail 9, the rail 9 being preferably, although not necessarily, constructed of wood, in order to prevent injury to the fruit. Now, as the fruit is moved rearwardly with the side portions of the conveyer belt, the fruit in brushing or bearing against the sides of the rail 9, will be given a rotating tendency. In other words, the fruit will roll along the sides of the rail 9, upon axes perpendicular to the inclined side portions of the conveyer belt, and as a consequence, the major or greater diameter of the fruit will be brought perpendicular to the inclined side portions of the conveyer belt. This is attained by the fact that the fruit will tend to move with the least resistance, it being apparent that the fruit would more readily rotate about their major or greater diameters, than their minor or shortest diameters.

Particular attention is directed to the fact that the movable side portion of each auxiliary or supplemental trough is inclined laterally at a relatively small angle, while the other or stationary side portion of the supplemental or auxiliary trough is inclined laterally at a relatively large angle, whereby the greater portion of the weight of the fruit will be sustained by the movable side portions of the auxiliary trough, in order that the fruit will be properly conveyed longitudinally. the fruit leaning with sufficient weight against the stationary side portion of the auxiliary trough.

As the fruit is moved rearwardly, as above described, the largest grade or size of the fruit, will be engaged by the first set of gaging belts 15, which will roll or eject the larger grade of fruit outwardly over and off of the side edges of the conveyer belt, it being apparent that the lower runs of the gaging belts in moving outwardly will carry out the said function. It is also evident that the lower runs of the gaging belts may yield so as to prevent injury or bruises to the fruit, the edge portions of the conveyer belt also being adapted to yield for this purpose. The smaller sizes of the fruit will readily pass below the first set of gaging devices, and as the several grades or sizes of the fruit encounter the successive gaging devices, they will be rolled or ejected laterally over and off the side edges of the conveyer belt into the proper bins or receptacles.

The present machine may be employed for sizing or assorting two kinds or species of fruit at the same time, it being apparent that the machine is duplicated at the opposite sides. It will also be obvious that the machine may be constructed for grading or sorting only one kind or species of fruit, the other advantages and capabilities of the present apparatus will be apparent to those skilled in the art, in connection with the foregoing description, taken with the drawing.

Having thus described the invention, what is claimed as new is:—

1. In a grading machine, a fruit feeder including a V-shaped trough, one side portion of the trough being inclined laterally at a relatively small angle and being movable longitudinally to carry the fruit therewith with the fruit leaning against the other side portion, the last mentioned side portion being inclined laterally at a relatively large angle, and gaging and ejecting means disposed above the first mentioned side portion of the trough and working away from the second mentioned portion.

2. In a fruit grading machine, a fruit feeder including a V-shaped trough, the sides of the trough being inclined laterally at relatively small and large angles, and a conveyer belt movable upon that side of the trough which is inclined at a relatively small angle, to carry the fruit therewith with the fruit leaning against the other side of the trough, and gaging and ejecting means disposed above the conveyer belt and working away from the last mentioned side of the trough.

3. In a grading machine, a fruit feeder including a V-shaped trough, and a conveyer belt movable upon one side portion of the trough, and having one edge projecting beyond the said side portion of the trough to yield as the fruit passes over the said edge, and yieldable gaging and ejecting means disposed above the conveyer belt and working away from the other side portion of the trough.

4. In a grading machine, a fruit feeder including a V-shaped trough, and a conveyer belt movable upon one side portion of the trough and having one edge projecting beyond said side portion of the trough to yield when the fruit is ejected from the trough over the said edge of the belt, and a gaging and ejecting means including a pulley disposed adjoining the other side portion of the trough, and a belt trained over the said pulley, the lower run of the last mentioned belt being disposed in coöperative relation above the conveyer belt and working away from the second mentioned side portion of the trough.

5. In a grading machine, a fruit feeder including a trough having a flat bottom and laterally inclined sides, a rail supported directly above the bottom of the trough and having inclined sides forming supplemental V-shaped troughs, with the sides of the first mentioned trough, and a belt passing along the first mentioned trough beneath the rail and having its side portions disposed upon the sides of the first mentioned trough, and gaging and ejecting devices disposed at the sides of the rail and having fruit engaging means movable away from the rail and coöperable with the side portions of the belt.

6. In a grading machine, a fruit feeder including a trough having a flat bottom and laterally inclined sides, a rail supported directly above the bottom of the trough and having inclined sides forming supplemental V-shaped troughs, with the sides of the first mentioned trough, and a belt passing along the first mentioned trough beneath the rail and having its side portions disposed upon the sides of the first mentioned trough, and gaging and ejecting devices at the sides of the rail, and each embodying a pulley disposed adjoining the respective side of the rail, and a belt trained around the pulley the lower run of the last mentioned belt forming fruit engaging means movable away from the rail and coöperable with the respective side portion of the first mentioned belt.

7. In a grading machine, a fruit feeder including a trough having laterally inclined sides, a rail disposed above the bottom of the trough and having inclined sides, and a belt movable between the trough and rail and having its side portions disposed upon the sides of the trough; and gaging and ejecting devices including shafts disposed at the sides of the rail, pulleys feathered upon shafts, frames connected loosely to the shafts, and having their free ends disposed adjoining the respective sides of the rail, pulleys carried by the free ends of the frames, belts trained over the respective pulleys, the lower runs of the belt being movable away from the rail, yokes connecting the free ends of the opposite frames, and adjustable members carried by the yokes and seatable upon the rail.

In testimony that I claim the foregoing as my own, I have hereto affixed my signature in the presence of two witnesses.

JAMES L. MAULL.

Witnesses:
J. B. SHIVER,
C. B. HUNTER.

Copies of this patent may be obtained for five cents each, by addressing the "Commissioner of Patents, Washington, D. C."